United States Patent
Ergin et al.

(10) Patent No.: US 12,476,558 B2
(45) Date of Patent: Nov. 18, 2025

(54) CONVERTER HAVING A QUICK TRANSITION TO A NORMAL OPERATING MODE AFTER AN INITIAL START-UP

(71) Applicant: SIEMENS AKTIENGESELLSCHAFT, Munich (DE)

(72) Inventors: Dominik Ergin, Baiersdorf (DE); Felix Kammerer, Erlangen (DE); Sebastian Müller, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 242 days.

(21) Appl. No.: 18/006,596

(22) PCT Filed: Jul. 24, 2020

(86) PCT No.: PCT/EP2020/070903
§ 371 (c)(1),
(2) Date: Jan. 24, 2023

(87) PCT Pub. No.: WO2022/017617
PCT Pub. Date: Jan. 27, 2022

(65) Prior Publication Data
US 2023/0291326 A1    Sep. 14, 2023

(51) Int. Cl.
*H02M 7/483* (2007.01)
*H02M 1/00* (2007.01)

(52) U.S. Cl.
CPC ....... *H02M 7/4835* (2021.05); *H02M 1/0003* (2021.05)

(58) Field of Classification Search
CPC ... H02M 7/219; H02M 7/4835; H02M 1/0003
See application file for complete search history.

(56) References Cited

U.S. PATENT DOCUMENTS 11,233,463 B2   1/2022 Robinson
11,349,384 B2 * 5/2022 Barupati ............. H02M 7/4835
(Continued)

FOREIGN PATENT DOCUMENTS

EP   2905889 A1   8/2015
EP   3522357 A1   8/2019
(Continued)

OTHER PUBLICATIONS

Yinglin Xue, Self-Start Control With Grouping Sequentially Precharge for the C-MMC-Based HVDC System, 2014, IEEE vol. 29 No. 1 Feb. 2014 (Year: 2014).*

(Continued)

*Primary Examiner* — Gustavo A Rosario-Benitez
(74) *Attorney, Agent, or Firm* — Laurence A. Greenberg; Werner H. Stemer; Ralph E. Locher

(57) ABSTRACT

A converter has module devices each with a series connection of at least two partial modules being electrically connected in series. A central device is configured to switch module control devices, in which a sum of the transmitted voltage values or the transmitted sum value reaches a predefined voltage threshold, into a second charging phase of a charging operation by transmitting a first voltage specification relating to switched-off partial modules and a second voltage specification relating to switched-on partial modules to the module control devices. The module devices are configured to meet the first and second voltage specifications by setting none, one or more of the communication-capable partial modules thereof into a switched-on operating state and none, one or more of the other communication-capable partial modules thereof into a switched-off operating state, and to continue the charging of the energy stores which are in the switched-on and blocked operating state.

11 Claims, 3 Drawing Sheets

(56) References Cited

U.S. PATENT DOCUMENTS

| | | | | |
|---|---|---|---|---|
| 2014/0146586 A1* | 5/2014 | Das | ................ | H02M 7/4835 |
| | | | | 363/13 |
| 2016/0226480 A1 | 8/2016 | Marquardt | | |
| 2016/0294276 A1* | 10/2016 | Onishi | ................ | H02M 1/36 |
| 2017/0170742 A1* | 6/2017 | Rauchenstein | ......... | H02M 5/44 |
| 2019/0068076 A1* | 2/2019 | Uda | ................ | H02M 7/483 |
| 2019/0081551 A1* | 3/2019 | Hu | ................ | H02J 3/18 |
| 2022/0045624 A1* | 2/2022 | Takahashi | ............. | H02M 1/32 |

FOREIGN PATENT DOCUMENTS

| | | |
|---|---|---|
| WO | WO 2015036149 A1 | 3/2015 |
| WO | WO 2019022745 A1 | 1/2019 |
| WO | WO 2019205368 A1 | 10/2019 |

OTHER PUBLICATIONS

R. Marquardt: "Modular Multilevel Converter: An Universal Concept for HVDC-networks and Extended DC-bus-applications," International Power Electronics Conference (IPEC), 2010, pp. 502-507.

\* cited by examiner

CONVERTER HAVING A QUICK TRANSITION TO A NORMAL OPERATING MODE AFTER AN INITIAL START-UP

FIELD AND BACKGROUND OF THE INVENTION

The invention relates to converters and methods for operating same.

The laid-open specification "Modular Multilevel Converter: An universal concept for HVDC-Networks and extended DC-Bus-Applications" (R. Marquardt, 2010 International Power Electronics Conference, pages 502 to 507, 978-1-4244-5393-1/10, 2010 IEEE) discloses an electrical converter in the form of a multilevel converter which comprises an at least two-phase AC voltage side having at least two AC voltage connections, a DC voltage side and module devices, which each have a series circuit having at least two submodules which are connected electrically in series. The submodules each comprise an energy store and at least two switching elements, of which at least one switching element is switched on in the switched-on or switched-off operating state of the submodules and all of the switching elements are switched off in the blocked operating state.

A multilevel converter having a different type of submodules is known from the international laid-open specification WO 2015/036149 A1.

SUMMARY OF THE INVENTION

The invention is based on the object of specifying a converter which enables a quick transition to the normal operating mode after an initial start-up, in which the energy stores of the submodules are initially not yet sufficiently charged, and can adjust symmetrical charging ratios—based on the states of charge of the module devices—during the charging in a particularly simple manner.

This object is achieved according to the invention by a converter having the features as claimed in the independent converter patent claim.

Advantageous configurations of the converter according to the invention are specified in the dependent claims.

Advantageous configurations of the converter according to the invention are specified in the dependent claims.

Accordingly, provision is made according to the invention for the submodules to each comprise a submodule control device, which determines the operating state of the submodule by driving the switching elements, the converter is designed to, after an initial start-up, in which all of the submodules are initially in the blocked operating state and the submodule control devices are as yet not communications-ready owing to a lack of sufficient state of charge of their associated energy stores, be set initially to a first charging phase of a charging operating mode, which comprises at least the first and a subsequent second charging phase, the submodule control devices to be designed to each communicate with a module control device associated therewith as soon as they have become communications-ready during the first charging phase, the module control devices to be configured to send voltage values sent by the submodule control devices or sum values derived therefrom to a superordinate central device of the converter during the first charging phase, the central device to be designed to switch over those module control devices in which the sum of the sent voltage values or the sent sum value reaches or exceeds a preset voltage threshold to the second charging phase of the charging operating mode by virtue of it sending a first voltage preset, which relates to switched-off submodules, and a second voltage preset, which relates to switched-on submodules, to these module control devices, and the module devices to be in addition designed to fulfill or at least approximately fulfill the first and second voltage presets by virtue of them setting none, one or more of their communications-ready submodules to the switched-on operating state and none, one or more of their other communications-ready submodules to the switched-off operating state and continuing the charging of the energy stores which are in the switched-on and blocked operating state. A significant advantage of the converter according to the invention consists in that it can perform in each case one transition from the first charging phase to the second charging phase in the case of each of the module devices even when as yet not all of the submodules of the relevant module device are communications-ready and therefore are not yet drivable. By presetting the first and second voltage presets, the module devices in the second charging phase can be transferred advantageously already to an optimized charging operating mode in which some of the submodules whose energy stores are already charged sufficiently at least for a communications operating mode are charged further in a targeted manner and others are excluded in a targeted manner from further charging. By means of this procedure, it is possible to achieve, for example, a situation whereby, at the time at which all of the submodules of all of the module devices are communications-ready and therefore drivable, already some of the submodules have very much higher charging voltages than others or than the average of the submodules.

A further significant advantage of the converter according to the invention can be seen to be that, by virtue of presetting the first and second voltage presets, asymmetries between the states of charge of the module devices can be minimized in a targeted manner or their occurrence can be prevented or at least prevented as best as possible; if, for example, in the case of one of the module devices the first voltage preset is selected to be greater than in the case of another module device, the sum voltage of the submodule voltages in the first-mentioned module device will rise less quickly than in the second-mentioned module device, and vice versa.

It is advantageous if the preset voltage threshold is dimensioned such that it is reached or exceeded even when as yet not all of the submodules of the respective module device are communications-ready.

The preset voltage threshold is preferably dimensioned such that it is reached or exceeded when a preset number, which is between 25% and 50% of the submodules of the respective module device, of submodules is communications-ready.

Alternatively, provision can be made for the preset voltage threshold to be between 25% and 50% of the sum voltage to be expected for the case where all of the submodules of the respective module device are communications-ready.

The first and/or the second voltage preset is preferably determined using a first outer voltage value which specifies the voltage on the first connection side, a second outer voltage value which specifies the voltage on the second connection side and/or the voltage values or sum values sent by the module control devices.

In an advantageous variant embodiment, provision is made for the first connection side to be a single- or polyphase AC voltage side, and the second connection side to be a DC voltage side.

In the case of a charging operating mode from the AC voltage side, the second voltage preset is preferably determined in accordance with:

$$U\text{on,set} = f(U\text{dc}, U\text{dc,set}, t)$$

where Udc denotes the DC voltage present on the DC voltage side, Udc,set denotes a setpoint DC voltage to be set on the DC voltage side, and Uon,set denotes the second voltage preset, and where f is a function which rises, preferably stepwise or in ramp form, over time t and which rises from zero to a maximum value Uon,set,max=Udc,set−Udc.

The first voltage preset is preferably determined in the case of a charging operating mode from the AC voltage side in accordance with:

$$U\text{off,set} = f(U\text{ac}, U\text{final,set}, U\text{on,set}, t)$$

where Uac denotes the AC voltage present on the AC voltage side, Uon,set deontes the second voltage preset, and Uoff,set denotes the first voltage preset, where f is a function which rises, preferably stepwise or in ramp form, over time t and which rises from zero to a maximum value Uoff,set,max, and where $$U\text{off,set,max} = U\text{final,set} - q - U\text{ac} - |U\text{on,set}|$$

where Ufinal,set specifies the setpoint voltage sum from the submodule voltages present at the energy stores of the submodules in the case of each of the submodules after the end of the charging phase and at the beginning of the normal operating mode, which setpoint voltage sum is dependent on the working point of the converter to be set at the beginning of the normal operating mode, and where q is one in the case of half bridges as submodules and is 0.5 in the case of full bridges as submodules.

In the case of a charging operating mode from the DC voltage side, the second voltage preset Uon,set is preferably fixed at zero. The first voltage preset Uoff,set is preferably determined in accordance with:

$$U\text{off,set} = f(U\text{ac}, U\text{dc}, U\text{final,set}, t)$$

where Uac specifies the AC voltage present on the AC voltage side, and

Ufinal,set specifies the setpoint voltage sum from the submodule voltages (in the case of each of the submodules) present at the energy stores of the submodules after the end of the charging phase and at the beginning of the normal operating mode, which setpoint voltage sum is dependent on the working point of the converter to be set at the beginning of the normal operating mode, and where f is a function which rises, preferably stepwise or in ramp form, over time t and which rises from zero to a maximum value Uoff,set, max=Ufinal,set−0.5−(Udc−Uac).

The invention also relates to a module control device for a converter, in particular a converter as has been described above. In accordance with the invention, provision is made for the module control device to be configured to send voltage values sent by submodule control devices or sum values derived therefrom to a superordinate central device during a first charging phase, and the module control device to also be designed to fulfill a first and a second voltage preset of the central device by virtue of it setting at least one communications-ready submodule to the switched-on or switched-off operating state and continuing the charging of the energy stores which are in the switched-on and blocked operating state.

With respect to the advantages and advantageous configurations of the submodule control device according to the invention, reference is made to the above statements in connection with the converter according to the invention and the advantageous configurations thereof.

The invention also relates to a central device for a converter, in particular a converter as has been described above. In accordance with the invention, provision is made for the central device to be designed to switch over module control devices in which the sum of sent voltage values or a sent sum value reaches or exceeds a preset voltage threshold to a second charging phase of a charging operating mode by virtue of it sending a first voltage preset, which relates to switched-off submodules, and a second voltage preset, which relates to switched-on submodules, to these module control devices.

As regards the advantages and advantageous configurations of the central device according to the invention, reference is made to the above statements in connection with the converter according to the invention and the advantageous configurations thereof.

The invention also relates to a method for operating a converter, which comprises a first connection side and a second connection side and module devices, which each have a series circuit having at least two submodules which are connected electrically in series, wherein the submodules each comprise an energy store and at least two switching elements, of which at least one switching element is switched on in the switched-on or switched-off operating state of the submodule and all of the switching elements are switched off in the blocked operating state.

In accordance with the invention, provision is made for the converter, after an initial start-up, in which all of the submodules are initially in the blocked operating state and submodule control devices of the submodules are as yet not communications-ready owing to a lack of sufficient state of charge of their associated energy stores, to be set initially to a first charging phase of a charging operating mode, which comprises at least the first and a subsequent second charging phase, the submodule control devices, which determine the operating state of the submodule associated therewith in each case by means of driving the switching elements, to each communicate with a module control device associated therewith as soon as they have become communications-ready during the first charging phase, the module control devices to send voltage values sent by the submodule control devices or sum values derived therefrom to a superordinate central device of the converter during the first charging phase, the central device to switch over those module control devices in which the sum of the sent voltage values or the sent sum value reaches or exceeds a preset voltage threshold to the second charging phase of the charging operating mode by virtue of it sending a first voltage preset, which relates to switched-off submodules, and a second voltage preset, which relates to switched-on submodules, to these module control devices, and the module devices to fulfill or at least approximately fulfill the first and second voltage presets by virtue of them setting none, one or more of their communications-ready submodules to the switched-on operating state and none, one or more of their other communications-ready submodules to the switched-off operating state and continuing the charging of the energy stores which are in the switched-on and blocked operating state.

The invention will be explained in more detail below with reference to exemplary embodiments; in the drawings, by way of example:

DETAILED DESCRIPTION OF THE INVENTION

For reasons of clarity, always the same reference symbols are used in the figures for identical or comparable components.

Figure 1:
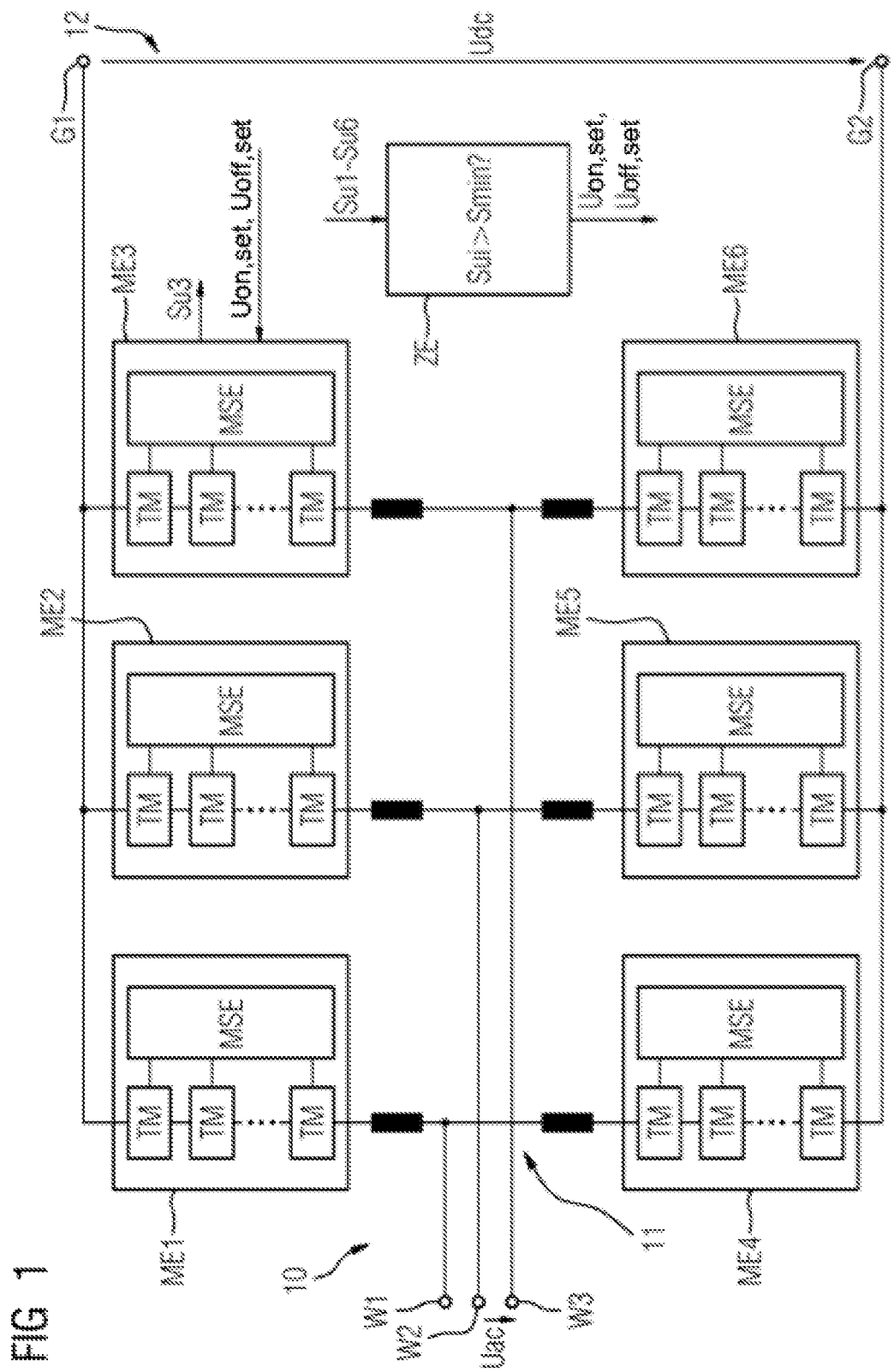
FIG. 1 shows an exemplary embodiment of a converter according to the invention.

FIG. 1 shows an exemplary embodiment of a converter 10, which has a first connection side and a second connection side. In the exemplary embodiment shown in FIG. 1, the first connection side is formed by a three-phase AC voltage side 11, which has three AC voltage connections W1-W3, and the second connection side is formed by a DC voltage side 12, which has two DC voltage connections G1 and G2.

The converter 10 also comprises six module devices ME1-ME6, which each have a series circuit having two or more submodules TM which are connected electrically in series and a module control device MSE for driving the submodules TM of the respective module device ME1-ME6. The module control devices MSE are connected to a superordinate central device ZE of the converter 10 via communications lines, which are not shown in any further detail in FIG. 1 for reasons of clarity.

The submodules TM each comprise a submodule control device TMSE, an energy store ES (cf. FIGS. 2 and 3) and at least two switching elements, of which in each case at least one switching element is switched on both in the switched-on and in the switched-off operating state of the submodule TM and all of the switching elements are switched off in the blocked operating state of the submodule. The submodule control device TMSE in each case determines the operating state of its submodule TM by driving the switching elements.

Figure 2:
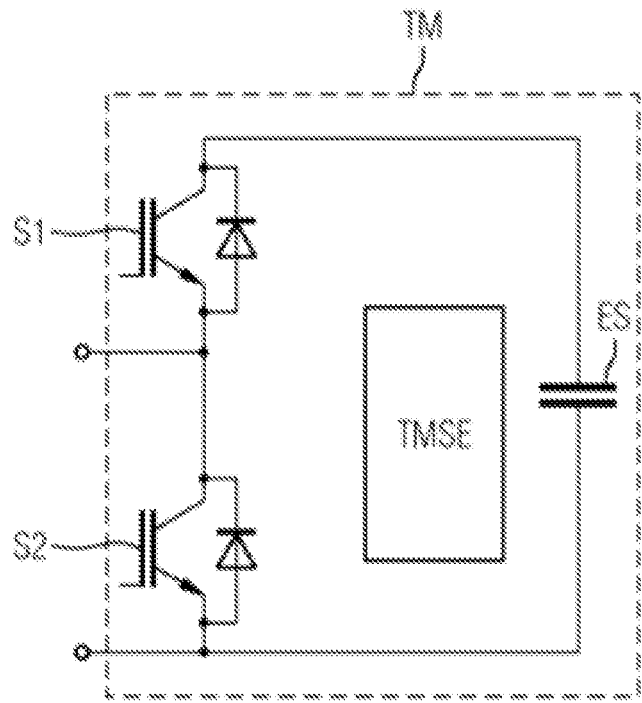
FIG. 2 shows a first exemplary embodiment of a submodule suitable for the converter shown in FIG. 1.

FIG. 2 shows an exemplary embodiment of a submodule TM in the form of a so-called half-bridge module, which can be used in the case of the converter 10 shown in FIG. 1. The submodule TM shown in FIG. 2 comprises two switching elements S1 and S2, which are each formed by a transistor and a freewheeling diode connected in parallel, and an energy store ES in the form of a capacitor. In addition, FIG. 2 shows the submodule control device TMSE, which drives the two switching elements S1 and S2.

Figure 3:
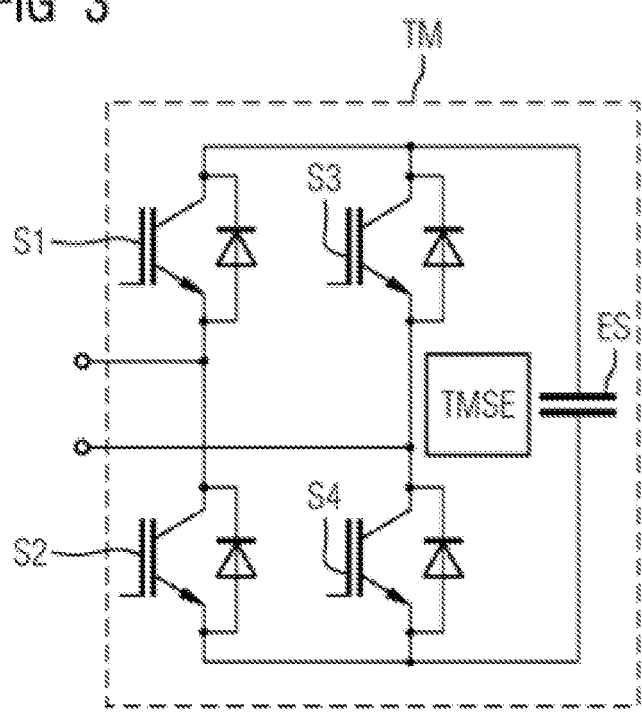
FIG. 3 shows a second exemplary embodiment of a submodule suitable for the converter shown in FIG. 1.

FIG. 3 shows an exemplary embodiment of a submodule TM in the form of a so-called full-bridge module, which can be used in the case of the converter 10 shown in FIG. 1. The submodule TM comprises four switching elements S1 to S4, which are each formed by a transistor and a freewheeling diode connected in parallel, and an energy store ES in the form of a capacitor. In addition, FIG. 3 shows the submodule control device TMSE, which drives the four switching elements S1 to S4.

Referring back to FIG. 1, in the case of the converter 10, the module control devices MSE are suitable in the normal operating mode for ensuring a preset energy flow between the two connection sides 11 and 12 of the converter 10 by virtue of driving the submodule control devices TMSE of their submodules TM.

After an initial start-up of the converter 10, the submodule control devices TMSE are as yet not communications-ready, however, owing to a lack of sufficient state of charge of their associated energy stores ES; also, the submodule control devices TMSE cannot yet drive their associated switching elements S1-S2 shown in FIG. 2 or S1-S4 shown in FIG. 3, for which reason the switching elements are likewise still disconnected. In other words, after an initial start-up, in the case of each module device ME1-ME6 all of the submodules TM are initially in the blocked operating state because the energy stores ES are as yet not sufficiently charged and therefore none of the switching elements can be switched on.

For this reason, after an initial start-up of the converter 10, said converter is set initially to a charging operating mode, which comprises a first and a second charging phase. The charging operating mode can take place, as will be explained in more detail further below, from the AC voltage side 11 or the DC voltage side 12 by virtue of an AC voltage being applied to the AC voltage connections W1-W3 or a DC voltage being applied to the DC voltage connections G1 and G2.

As soon as the submodule control devices TMSE become communications-ready during the first charging phase because their energy stores ES are sufficiently charged and operating energy can be made available, they each begin to communicate with their associated module control device MSE. As part of the communication, the submodule control devices TMSE each send voltage values U, which specify the respective voltage at their energy store ES, to the module control device MSE which is superordinate with respect to them.

The module control devices MSE in turn send the voltage values U sent by the submodule control devices TMSE or sum values Sui (where i=1, 2, . . . 6) derived therefrom, as is shown by way of example in FIG. 1 explicitly for the sum value Su3 of the module device ME3, to the superordinate central device ZE. The index i identifies in each case the associated module device MEi, i.e. ME1-ME6, and therefore the module control devices MSE thereof. Since the converter 10 shown in FIG. has six module control devices MSE, six sum values Su1-Su6 are therefore sent to the central device ZE.

The central device ZE is designed to switch over those module control devices MSE in which the sum of the sent voltage values or the sent sum value already reaches or exceeds a preset voltage threshold Smin to the second charging phase of the charging operating mode by virtue of it sending a first voltage preset Uoff,set, which relates to switched-off submodules TM, and a second voltage preset Uon,set, which relates to switched-on submodules TM, to these module control devices MSE. In other words, therefore the module devices ME1-ME6 are each individually set to the second charging phase as soon as they qualify for it.

Specifically, the first voltage preset Uoff,set preferably defines the sum voltage which switched-off submodules should reach, and the second voltage preset Uon,set defines the sum voltage which switched-on submodules should reach.

The module devices ME1-ME6 are designed to fulfill or at least fulfill as best as possible the first and second voltage presets Uoff,set and Uon,set by virtue of them setting none, one or more of their communications-ready submodules TM to the switched-on operating state and none, one or more of their other communications-ready submodules TM to the switched-off operating state and continuing the charging of the energy stores ES which are in the switched-on and blocked operating state.

The algorithm used for determining the submodules TM to be switched on and off is in this case any desired algorithm; the best-possible fulfillment of the voltage presets of the central device ZE can be determined, for example, by a simulation in the sense of a computer-based testing of all possible operating configurations of the communications-ready submodules TM and subsequent selection of that operating configuration which ensures the best-possible fulfillment of the voltage presets. In view of the computational power of modern-day processors and the comparatively low number of submodules in converters, such a brute force-like approach can be performed without any problems.

In order to achieve as quick a transition from the first charging phase to the second charging phase as possible in the case of all of the submodules TM, the preset voltage threshold Smin is dimensioned such that it is reached or exceeded even when as yet not all of the submodules TM of the respective module device ME1-ME6 are communications-ready. By virtue of early switch-off of already communications-ready submodules TM, the available charging voltage can advantageously be used for the as yet not communications-ready submodules TM, with the result that they become communications-ready more quickly than would be the case if all of the submodules TM were to be charged simultaneously. Since the switched-on submodules are charged further, with these a particularly high charging voltage can be achieved in a targeted manner which can be of use for the operation of the converter 10 after the end of the charging phase.

The preset voltage threshold Smin is preferably dimensioned such that it is reached or exceeded when a preset number, which is between 25% and 50% of the submodules TM of the respective module device ME1-ME6, of submodules TM is communications-ready. Alternatively, the preset voltage threshold Smin can be between 25% and 50% of the sum voltage to be expected for the case where all of the submodules TM of the respective module device ME1-ME6 are communications-ready.

As is described in more detail further below for different case configurations, the first and second voltage presets are preferably determined using a first outer voltage value which specifies the voltage on the AC voltage side 11, a second outer voltage value which specifies the voltage on the DC voltage side 12, and/or the voltage values or sum values Su1-Su6 sent by the module control devices MSE.

In the case where the charging operating mode takes place from the AC voltage side 11, the second voltage preset Uon,set is preferably determined in accordance with:

$$U\text{on,set}=f(U\text{dc},U\text{dc,set},t)$$

Udc in the above formula denotes the DC voltage present on the DC voltage side 12, and Udc,set denotes a setpoint DC voltage to be set on the DC voltage side 12. f in the above formula denotes a function which rises, preferably stepwise or in ramp form, over time t and which rises from zero to a maximum value Uon,set,max=Udc,set−Udc.

The first voltage preset Uoff,set is preferably determined in accordance with:

$$U\text{off,set}=f(U\text{ac},U\text{final,set},U\text{on,set},t)$$

Uac in the above formula denotes the AC voltage present on the AC voltage side 11, for example as amplitude or rms value of the conductor-to-conductor voltage between the AC voltage connections W1-W3. f in the above formula is a function which rises, preferably stepwise or in ramp form, over time t and which rises from zero to a maximum value Uoff,set,max.

For the maximum value Uoff,set,max, the following preferably applies:

$$U\text{off,set,max}=U\text{final,set}-q-U\text{ac}-|U\text{on,set}|$$

Ufinal,set in the above formula denotes the setpoint voltage sum from the submodule voltages U present at the energy stores ES of the submodules TM after the end of the charging phase and at the beginning of the normal operating mode, which setpoint voltage sum is dependent on the working point of the converter to be set at the beginning of the normal operating mode. In the above formula, q is one in the case of half bridges as submodules TM (cf. FIG. 2) and is 0.5 in the case of full bridges as submodules TM (cf. FIG. 3).

In the case where the charging operating mode takes place from the DC voltage side 12, the second voltage preset Uon,set is preferably fixed at zero. The first voltage preset is preferably determined during the charging operating mode from the DC voltage side 12 in accordance with:

$$U\text{off,set}=f(U\text{ac},U\text{dc},U\text{final,set},t)$$

Uac in the above formula denotes the AC voltage present on the AC voltage side 11, for example as amplitude or rms value of the conductor-to-conductor voltage between the AC voltage connections W1-W3. Ufinal,set in the above formula again specifies the setpoint voltage sum from the submodule voltages U present at the energy stores ES of the submodules TM after the end of the charging phase and at the beginning of the normal operating mode, which setpoint voltage sum is dependent on the working point of the converter to be set at the beginning of the normal operating mode. f is a function which rises, preferably stepwise or in ramp form, over time t and which rises from zero to a maximum value $$U\text{off,set,max}=U\text{final,set}-0.5-(U\text{dc}-U\text{ac}).$$

Figure 4:
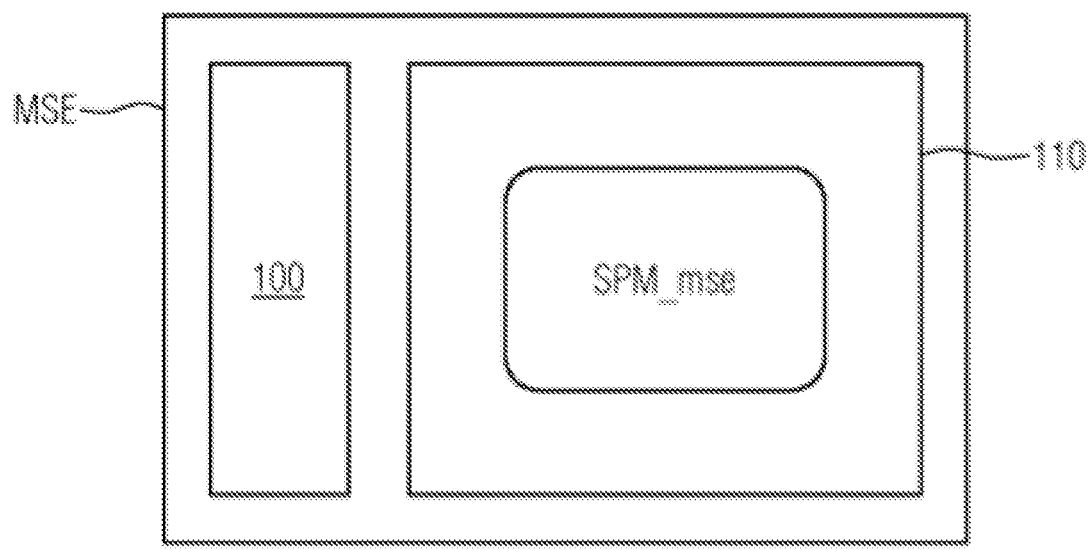
FIG. 4 shows an exemplary embodiment of a module control device according to the invention.

FIG. 4 shows an exemplary embodiment of a module control device MSE which can be used in the case of the converter 10 shown in FIG. 1. The module control device MSE comprises a computation device 100 and a memory 110. A software program module SPM_mse is stored in the memory 110 and, when run by the computation device 100, effects an operation of the module control device MSE, as is described by way of example above.

Figure 5:
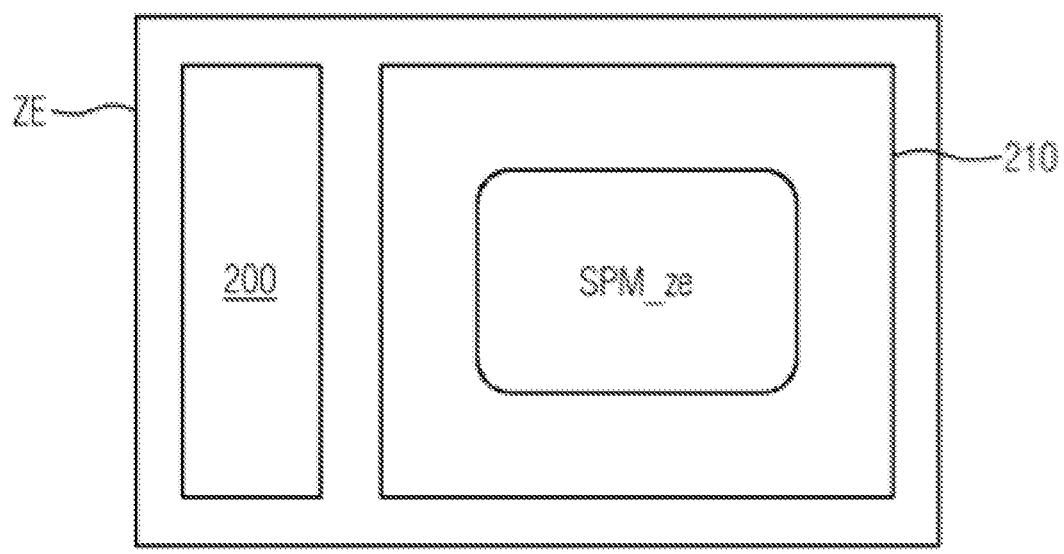
FIG. 5 shows an exemplary embodiment of a central device according to the invention.

FIG. 5 shows an exemplary embodiment of a central device ZE, which can be used in the converter 10 shown in FIG. 1. The central device ZE comprises a computation device 200 and a memory 210. A software program module SPM_ze is stored in the memory 210 and, when run by the computation device 200, effects an operation of the central device ZE, as is described by way of example above.

The converter described above by way of example or the operating method thereof can have one or more of the properties or features listed below in dashed subparagraphs:

In the case of the described operating method, during the active charging phase energy can be given out or emitted by the submodules TM. This makes it possible to raise the DC voltage beyond the passive charging voltage and provides additional degrees of freedom in the energy balancing of the converter 10 during this phase.

The described operating method for active precharging makes it possible to compensate for asymmetries between the six module devices ME1-ME6 during the active charging phase. If the precharging takes place from the AC side, a vertical balancing of the upper or lower three module devices with respect to one another is possible. If the precharging of the converter 10 takes place from the DC system, the balancing of all six module devices ME1-ME6 with respect to one another is possible.

The enabling of the active charging phase can also take place when as yet not all of the submodules TM in a module device ME1-ME6 have reported back as operationally ready. Asymmetries in the module voltage distribution within a power converter arm can be reduced by the proposed operating method as soon as a sufficient number of submodules is in the operationally ready state.

The operating method therefore enables the runup of partially active converters 10 both during precharging on the AC side and during precharging on the DC side.

The operating method makes it possible to raise the passive charging voltage of the DC system during the active precharging from the AC side. As a result, transient phenomena during the switchover to the normal operating mode can be prevented. As a result, the loading of all of the components of the installation and reactions on the AC grid is minimized.

Although the invention has been illustrated and described in detail by preferred exemplary embodiments, the invention is not restricted by the disclosed examples, and other variants can be derived therefrom by a person skilled in the art without departing from the scope of protection of the invention.

Reference Symbols

10 converter
11 first connection side/AC voltage side
12 second connection side/DC voltage side
100 computation device
110 memory
200 computation device
210 memory
ES energy store
G1 DC voltage connection
G2 DC voltage connection
ME1-ME6 module devices
MSE module control device
S1 switching element
S2 switching element
S3 switching element
S4 switching element
Smin preset voltage threshold
SPM_mse software program module
SPM_ze software program module
Sui sum value
TM submodule
TMSE submodule control device
U voltage value
Uoff,set first voltage preset
Uon,set second voltage preset
W1 AC voltage connection
W2 AC voltage connection
W3 AC voltage connection
ZE central device

The invention claimed is:

1. A converter, comprising:
a first connection side;
a second connection side;
module devices each having a series circuit with at least two submodules which are connected electrically in series, wherein said submodules each having an energy store and at least two switching elements, of which at least one of said switching elements is switched on, in a switched-on or switched-off operating state of a submodule of said submodules, and all of said switching elements being switched off in a blocked operating state, wherein said submodules each have a submodule control device, which determines the operating state of said submodule by driving said switching elements, each of said module devices further having a module control device;

the converter being configured to, after an initial start-up, in which all of said submodules are initially in the blocked operating state and said submodule control devices are as yet not communications-ready owing to a lack of sufficient state of charge of a respective said energy store, be set initially to a first charging phase of a charging operating mode, which has at least a first and a subsequent second charging phase;

said submodule control devices being configured to each communicate with said module control device associated with said submodule control devices as soon as they have become communications-ready during the first charging phase;

a superordinate central device;

said module control devices are configured to send voltage values sent by said submodule control devices or sum values derived from the voltage values to said superordinate central device during the first charging phase;

said superordinate central device configured to switch over those of said module control devices in which a sum of the voltage values or a sum value reaches or exceeds a preset voltage threshold to the second charging phase of the charging operating mode by virtue of said superordinate central device sending a first voltage preset, which relates to switched-off said submodules, and a second voltage preset, which relates to switched-on said submodules, to said module control devices;

said module devices configured to fulfill or at least approximately fulfill the first and second voltage presets by virtue of them setting none, one or more of their communications-ready said submodules to the switched-on operating state and none, one or more of their other communications-ready said submodules to the switched-off operating state and continuing the charging of said energy stores which are in the switched-on and blocked operating state;

said first connection side is a single-phase or polyphase AC voltage side, said second connection side is a DC voltage side, the charging operating mode takes place from said single-phase or polyphase AC voltage side, and the second voltage preset is determined in accordance with:

$$U\text{on,set} = f(U\text{dc}, U\text{dc,set}, t);$$

where:
Udc denotes a DC voltage present on said DC voltage side;
Udc,set denotes a setpoint DC voltage to be set on said DC voltage side,
Uon,set denotes the second voltage preset; and
f is a function which rises over time t and which rises from zero to a maximum value Uon,set,max=Udc,set−Udc.

2. The converter according to claim 1, wherein the preset voltage threshold is dimensioned such that it is reached or exceeded even when as yet not all of said submodules of a respective module device of said module devices are communications-ready.

3. The converter according to claim 1, wherein the preset voltage threshold is dimensioned such that it is reached or exceeded when a preset number of said submodules is communications-ready, wherein the preset number is between 25% and 50% of said submodules of a respective one of said modules devices.

4. The converter according to claim 1, wherein the preset voltage threshold is between 25% and 50% of a sum voltage to be expected for a case where all of said submodules of a respective module device of said module devices are communications-ready.

5. The converter according to claim 1, wherein the first and/or the second voltage preset is determined using:
 a first outer voltage value which specifies a voltage on said first connection side;
 a second outer voltage value which specifies a voltage on said second connection side; and/or
 the voltage values or the sum values sent by said module control devices.

6. The converter according to claim 1, wherein the charging operating mode takes place from said DC voltage side, and the second voltage preset is fixed at zero.

7. A converter, comprising:
 a first connection side;
 a second connection side;
 module devices each having a series circuit with at least two submodules which are connected electrically in series, wherein said submodules each having an energy store and at least two switching elements, of which at least one of said switching elements is switched on, in a switched-on or switched-off operating state of a submodule of said submodules, and all of said switching elements being switched off in a blocked operating state, wherein said submodules each have a submodule control device, which determines the operating state of said submodule by driving said switching elements, each of said module devices further having a module control device;
 the converter being configured to, after an initial start-up, in which all of said submodules are initially in the blocked operating state and said submodule control devices are as yet not communications-ready owing to a lack of sufficient state of charge of a respective said energy store, be set initially to a first charging phase of a charging operating mode, which has at least a first and a subsequent second charging phase;
 said submodule control devices being configured to each communicate with said module control device associated with a respective one of said submodule control devices as soon as they have become communications-ready during the first charging phase;
 a superordinate central device;
 said module control devices are configured to send voltage values sent by said submodule control devices or sum values derived from the voltage values to said superordinate central device during the first charging phase;
 said superordinate central device configured to switch over those of said module control devices in which a sum of the voltage values or a sum value reaches or exceeds a preset voltage threshold to the second charging phase of the charging operating mode by virtue of said superordinate central device sending a first voltage preset, which relates to switched-off said submodules, and a second voltage preset, which relates to switched-on said submodules, to said module control devices;
 said module devices configured to fulfill or at least approximately fulfill the first and second voltage presets by virtue of them setting none, one or more of their communications-ready said submodules to the switched-on operating state and none, one or more of their other communications-ready said submodules to the switched-off operating state and continuing the charging of said energy stores which are in the switched-on and blocked operating state;
 said first connection side is a single-phase or polyphase AC voltage side, said second connection side is a DC voltage side, the charging operating mode takes place from said single-phase or polyphase AC voltage side, and the first voltage preset is determined in accordance with:

$$U\text{off,set} = f(U\text{ac}, U\text{final,set}, U\text{on,set}, t)$$

where:
 Uac denotes an AC voltage present on said single-phase or polyphase AC voltage side;
 Uon,set denotes the second voltage preset;
 Uoff,set denotes the first voltage preset; and
 f is a function which rises over time t and which rises from zero to a maximum value Uoff,set,max, and where:

$$U\text{off,set,max} = U\text{final,set} - q - U\text{ac} - |U\text{on,set}|$$

where:
 Ufinal,set specifies a setpoint voltage sum from submodule voltages present at said energy stores of said submodules in a case of each of said submodules after an end of the charging phase and at a beginning of a normal operating mode, the setpoint voltage sum is dependent on a working point of the converter to be set at the beginning of the normal operating mode; and
 q is one in a case of half bridges as said submodules and is 0.5 in a case of full bridges as said submodules.

8. A converter, comprising:
 a first connection side being a single-phase or a polyphase AC voltage side;
 a second connection side being a DC voltage side;
 module devices each having a series circuit with at least two submodules which are connected electrically in series, wherein said submodules each having an energy store and at least two switching elements, of which at least one of said switching elements is switched on, in a switched-on or switched-off operating state of a submodule of said submodules, and all of said switching elements being switched off in a blocked operating state, wherein said submodules each have a submodule control device, which determines the operating state of said submodule by driving said switching elements, each of said module devices further having a module control device;
 the converter being configured to, after an initial start-up, in which all of said submodules are initially in the blocked operating state and said submodule control devices are as yet not communications-ready owing to a lack of sufficient state of charge of a respective said energy store, be set initially to a first charging phase of a charging operating mode, which has at least a first and a subsequent second charging phase;

said submodule control devices being configured to each communicate with said module control device associated with a respective one of said submodule control devices as soon as they have become communications-ready during the first charging phase;

a superordinate central device;

said module control devices are configured to send voltage values sent by said submodule control devices or sum values derived from the voltage values to said superordinate central device during the first charging phase;

said superordinate central device configured to switch over those of said module control devices in which a sum of the voltage values or a sum value reaches or exceeds a preset voltage threshold to the second charging phase of the charging operating mode by virtue of said superordinate central device sending a first voltage preset, which relates to switched-off said submodules, and a second voltage preset, which relates to switched-on said submodules, to said module control devices;

said module devices configured to fulfill or at least approximately fulfill the first and second voltage presets by virtue of them setting none, one or more of their communications-ready said submodules to the switched-on operating state and none, one or more of their other communications-ready said submodules to the switched-off operating state and continuing the charging of said energy stores which are in the switched-on and blocked operating state;

the charging operating mode takes place from said DC voltage side, and the first voltage preset is determined in accordance with:

$$U\text{off,set} = f(U\text{ac}, U\text{dc}, U\text{final,set}, t)$$

where: Udc denotes a DC voltage present on said DC voltage side; Uac denotes an AC voltage present on said single-phase or polyphase AC voltage side;

Uoff,set denotes the first voltage preset;

Ufinal,set specifies a setpoint voltage sum from submodule voltages present at said energy stores of said submodules in a case of each of said submodules after an end of the charging phase and at a beginning of a normal operating mode, the setpoint voltage sum is dependent on a working point of the converter to be set at a beginning of the normal operating mode; and f is a function which rises over time t and which rises from zero to a maximum value Uoff,set,max=Ufinal,set−0.5·(Udc−Uac).

9. The converter according to claim 1, wherein the function rises stepwise or in ramp form.

10. The converter according to claim 7, wherein the function rises stepwise or in ramp form.

11. The converter according to claim 8, wherein the function rises stepwise or in ramp form.

* * * * *